(No Model.)

W. H. PERRY.
GROOVED AND BARBED ROD.

No. 333,887. Patented Jan. 5, 1886.

WITNESSES
A. A. Connell
W. E. Chaffee

INVENTOR
W. H. Perry
By Connell Bros
Attorneys

UNITED STATES PATENT OFFICE.

WILLIAM H. PERRY, OF SHARON, PENNSYLVANIA.

GROOVED AND BARBED ROD.

SPECIFICATION forming part of Letters Patent No. 333,887, dated January 5, 1886.

Application filed August 19, 1885. Serial No. 174,815. (No model.)

*To all whom it may concern:*

Be it known that I, WILLIAM H. PERRY, a citizen of the United States, and a resident of Sharon, in the county of Mercer and State of Pennsylvania, have invented certain new and useful Improvements in Grooved and Barbed Rods and Bars, of which the following is a specification.

My invention has relation to the manufacture of barbed and grooved metallic bars or rods, and has for its object the provision of a bar, rod, or section of iron or steel of peculiar formation, as hereinafter described, which may be readily produced by the ordinary and well-known process of "rolling," "molding," "casting," or "dieing," and which, when so produced, will be a completed article of manufacture, ready to be placed upon the market as such, and subsequently employed in the manufacture of various articles, to which it may be adapted by its peculiar form.

My invention consists, essentially, of a rolled, molded, cast, or died rod or bar having longitudinal grooves, within which grooves are formed at regular intervals teeth, barbs, or the like.

Figure 1:
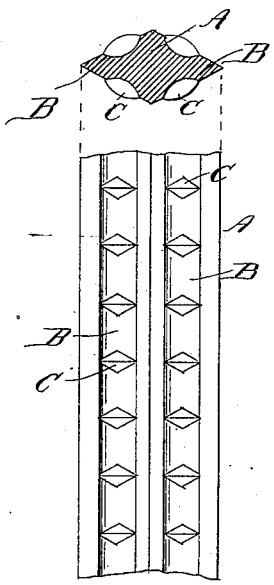
Figure 2:
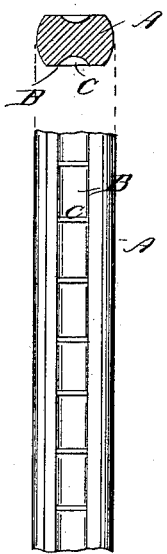
Figure 3:
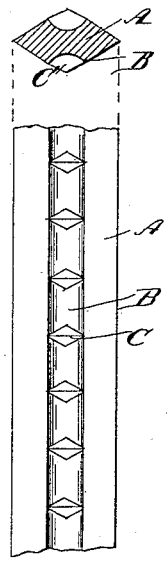

In the accompanying drawings I have illustrated several forms of bar, which, while slightly differing in form, all show the same essential characteristics. A designates the body of the bar or rod, which is of approximately diamond shape, as shown in Figure 1, or which may be oval—that is, with its sides slightly rounded—as shown in Fig. 2, or six-sided—that is, having opposing faces or surfaces parallel with each other, and on opposite sides of its central portion, as shown at *a* in Fig. 3.

I do not wish to be understood as limiting my invention to the precise form in cross-section of the bar, as a variety of forms may be employed without departing from the spirit of my invention.

Each of the bars A, it will be observed, is formed with longitudinal grooves B B, of which there may be two or more, and said grooves run the entire length of the bar or rod, as shown.

C C C, &c., designate barbs or teeth, which are formed within the grooves B B at regular intervals. These teeth or barbs may be of any desired size or form which it may be found feasible to form by the rolling, molding, casting, or dieing process, and said teeth or barbs are formed simultaneously with the rolling, molding, casting, or dieing of the grooves, the rib on the roll or rolls which serves to form the groove being suitably cut away at intervals, so as to form matrices for the production of the teeth or barbs.

Having described my invention, I claim—

As a new article of manufacture, a rolled, molded, cast, or died bar or rod having longitudinal grooves within which are teeth or barbs at intervals, substantially as described.

Signed at Sharon, in the county of Mercer and State of Pennsylvania, this 15th day of August, A. D. 1885.

WILLIAM H. PERRY.

Witnesses:
JOHN H. ELLIOTT,
CHAS. W. PALMER.